Patented June 18, 1940

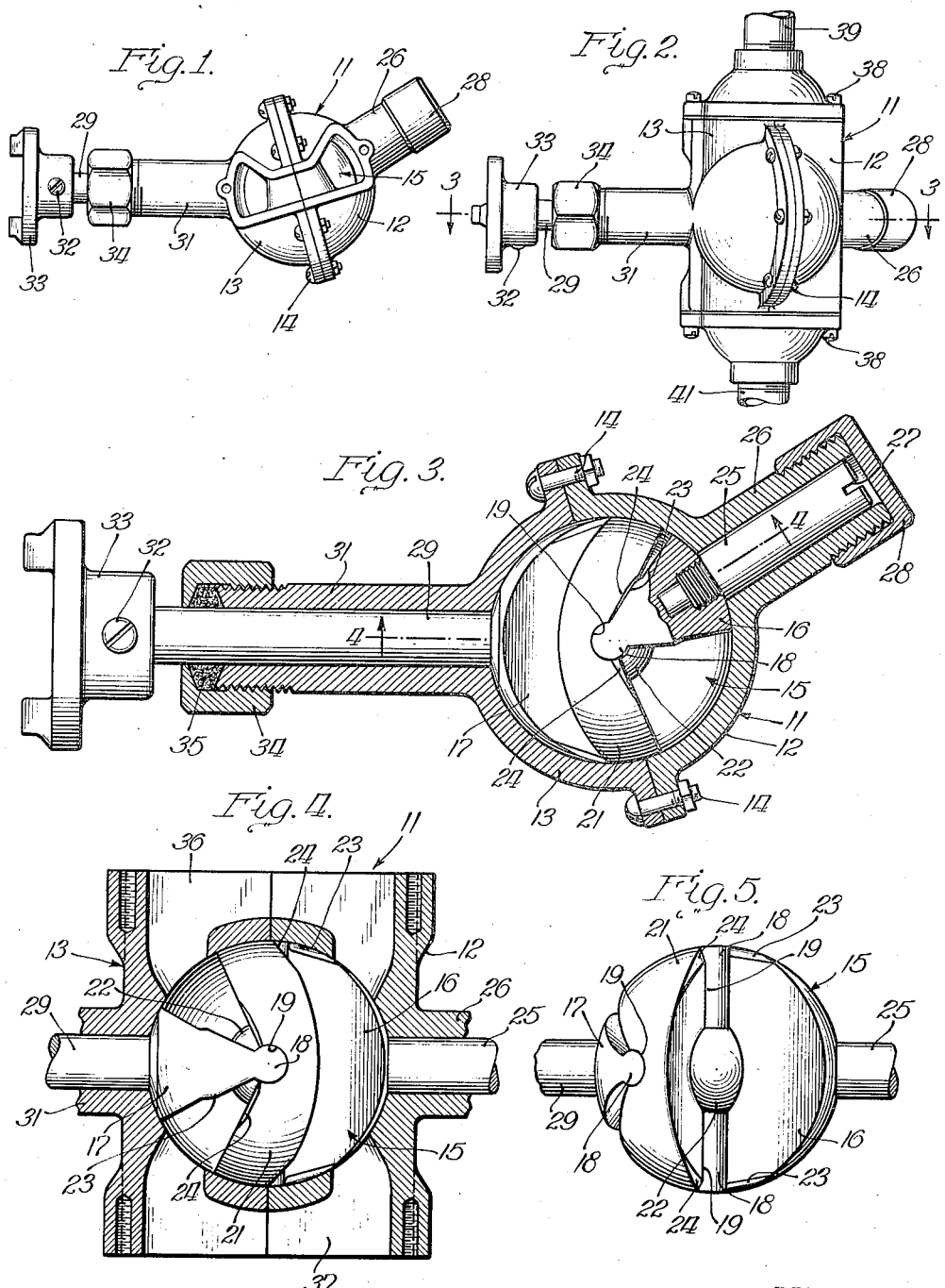

2,204,760

UNITED STATES PATENT OFFICE 2,204,760

FLUID CONTROL DEVICE

Ole Jensen, Chicago, Ill.

Application June 9, 1938, Serial No. 212,713

3 Claims. (Cl. 103—134)

This invention relates in general to fluid control devices and more particularly to a device which is adapted to be used as a pump, motor or the like.

A principal object of the invention is the provision of a pump or the like which is adapted to efficiently and positively deliver a maximum amount of fluid for the size of the pump.

An important object of the invention is the provision of a pump or the like which when used as a pump will deliver a constant volume of fluid when operating at a uniform speed.

Another important object of the invention is the provision of a rotary pump or the like which is adapted to reverse the discharge of the fluid without making any changes in the device.

Another important object of the invention is the provision of a device which is adapted to be used as a pump to discharge a volume of fluid, or as a motor by reversing the flow of fluid and using the fluid as the motivating force.

Another object of the invention is the provision of a pump or the like which has alternately expanding and contracting chambers which discharge the fluid at a constant rate of flow when a motivating force is attached thereto.

Numerous other objects and advantages of the invention will be apparent as it is better understood from the following description, which, when taken in connection with the accompanying drawing, discloses a preferred embodiment thereof.

In the drawing:

Figure 1 is a top plan view of a device incorporating my invention;

Figure 2 is an elevational view of the device shown in Figure 1;

Figure 3 is a cross sectional view, taken substantially on the line 3—3 of Figure 2;

Figure 4 is a sectional view of the device taken substantially on the line 4—4 of Figure 3; and Figure 5 is a detail elevational view of the rotor taken substantially at right angles to the position of the rotor as shown in Figure 3.

Referring more particularly to the drawing, reference numeral 11 indicates in general a housing or casing. The housing is divided into two portions 12 and 13, merely for convenience of manufacture and assembly, and are held together by means of bolts 14 or the like. Part of the casing 11 is spherical in shape so that a spherical rotating member 15 may be enclosed therein.

The rotating member 15 comprises a pair of segments 16 and 17 having cylindrical bearing members 18 formed at the apex of the segments. The bearings 18 are adapted to rest in appropriate journals 19 formed in a spheroidal member 21. A sphere or ball 22 is mounted at the center of the member 21 to provide a bearing surface for the segments 16 and 17. Overhanging lips 23 are formed on the segments 16 and 17 which are adapted to fit in corresponding cut-away portions 24 in the member 21 so as to insure a tight seam when the flat surface of either side of the segments 16 and 17 come in contact with the flat surfaces of the member 21.

A shaft 25 is screw-threaded into the segment 16 and is adapted to fit into a cylindrical extension 26, formed in the casing member 12. The inner surface of the extension 26 is machined so as to form a bearing surface for the shaft 25. It will be apparent that the shaft acts as a radial thrust bearing when the member 15 is rotated. A slot 27 is formed in the shaft or bearing 25 so that the same may be readily removed therefrom. A cap member 28 is fastened to the cylindrical extension 26 to permit of easy access to the shaft or bearing 25 and slot 27.

Fastened to the segment 17, in the usual manner, is another shaft 29 which is adapted to be rotated in a cylindrical extension 31 formed in the casing member 13. Attached to the other end of the shaft 29 by means of a screw 32, or the like is a coupling member 33. The coupling member 33 is adapted to be coupled with a motor, or other driving or driven means (not shown). A packing nut 34 is threaded to the one end of the extension 31 and holds in place the usual sealing or packing 35.

The casing 11 has an inlet opening 36 and an outlet opening 37 formed therein which are cast or formed integrally with the casing. Attached to the casing by means of bolts 38 or the like are fluid dispensing lines 39 and 41 which allow the fluid to pass through the casing 11.

When it is desired to use the device as a pump, the rotating member 15 is caused to revolve by any desired means of motive force, as for instance an electrical motor. The motor (not shown) is coupled to the coupling member 33 and when the motor is started, the coupling 33 and shaft 29 will be caused to rotate. The rotation of the shaft 29 will in turn cause the segment 17 to rotate which in turn causes the member 21 and the segment 16 to rotate in the same direction. The shaft 25 rotating in the extension 26 causes the segment 16 to follow the same path and will prevent it from varying its rate of flow.

The fluid will flow through the pipe 39 into the inlet 36 and upon coming into contact with the member 15 will be forced through the outlet 37 and pipe 41 with an increase in velocity thereof. As the member 15 rotates, the segments 16 and 17 form a series of chambers with the member 21 which allows the fluid to flow into the inlet 36 whence it is discharged through the outlet 37. The chambers formed by the segments 16 and 17 and the member 21 vary in volume from a minimum of no capacity to a maximum of the segment of a sphere which occurs when the segments 16 and 17 have one of their flat surfaces coinciding with the flat surfaces of the member 21. The fluid is therefore carried by these chambers and is forced out through the outlet 37 when the segments come into contact with the spheroidal member 21.

The device is compact and contiguous in structure and is adapted to be used as a booster pump in a fluid line when it is desired to increase the rate of flow of fluid between two adjoining places. The rate of flow may be varied merely by increasing or decreasing the rotation of the shaft 29 by means of the motor (not shown). The direction of the flow of fluid may also be reversed without any adjustment to the device by simply reversing the rotation of the motor. The outlet 37 will then become the inlet and the inlet becomes the outlet.

While the device is designed primarily to function as a pump the same may be used as a compressor wherein the gas is forced into a compression chamber or tank and is allowed to build up a pressure therein.

It is also possible to use the device as a motor which is adapted to drive a generator or other driven means. The flow of the fluid through the pipes 39 and 41 and through the rotating member will cause the rotating member to rotate and drive through the shaft 29 and coupling 33. Instead of causing a suction in the inlet 36 and allowing the fluid to flow therein, the fluid will flow through the inlet 36 and strike the segments 16 and 17 and cause the same to rotate, thus driving the shaft 29.

By having the bearings 18 resting in the journals 19 and the ball 22 placed therein a perfect form of universal is created which assures the opening and closing of the segments 16 and 17 with the least amount of friction possible. It is apparent, therefore, that an efficient and economical pump or motor may be constructed and operated with as little loss or waste as possible.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A rotatable device adapted to be used as a pump, comprising a two-part casing forming a spherical fluid working chamber, a substantially spherical rotatable member disposed interiorly thereof, said rotatable member comprising a substantially spherical segment-shaped member having a shaft secured thereto and a journal formed thereon, a substantially spherical arcuate-shaped member having a bearing surface formed therein adapted to receive said journal on said segment-shaped member for oscillation relative thereto on an axis of said spherical chamber, and a substantially spherical-shaped member mounted in suitable recesses formed adjacent the centers of said segment-shaped member and said arcuate-shaped member to prevent relative movement thereof in the direction of said axis.

2. A rotatable device adapted to be used as a pump, comprising a two-part casing forming a spherical fluid working chamber, a substantially spherical rotatable member disposed interiorly thereof, said rotatable member comprising a substantially spherical segment-shaped member having a shaft secured thereto and a journal formed thereon, a substantially spherical arcuate-shaped member having a bearing surface formed therein adapted to receive said journal on said segment-shaped member for oscillation relative thereto on an axis of said spherical chamber, a substantially spherical-shaped member mounted in suitable recesses formed adjacent the centers of said segment-shaped member and said arcuate-shaped member to prevent relative movement thereof in the direction of said axis, and a second substantially spherical segment-shaped member having a journal formed thereon adapted to be removably received by a bearing surface formed in said arcuate-shaped member for oscillation relative thereto on an axis of said spherical chamber.

3. A rotatable device adapted to be used as a pump, comprising a two-part casing forming a spherical fluid working chamber, a substantially spherical rotatable member disposed interiorly thereof, said rotatable member comprising a substantially spherical segment-shaped element having a shaft secured thereto and a journal formed thereon, a substantially spherical arcuate-shaped element having a bearing surface formed therein adapted to receive said journal on said segment-shaped element, a second substantially segment-shaped element journaled in arcuate-shaped element for oscillation relative thereto on a different axis of said spherical chamber, and a substantially spherical shaped member mounted in suitable recesses formed adjacent the centers of said segment-shaped elements and said arcuate-shaped member to prevent relative movement of at least two of said elements in the direction of one of said axes.

OLE JENSEN.